(12) United States Patent
Li et al.

(10) Patent No.: US 9,197,918 B2
(45) Date of Patent: Nov. 24, 2015

(54) METHODS AND SYSTEMS FOR GENERATING AMBIENT LIGHT EFFECTS BASED ON VIDEO CONTENT

(71) Applicant: Sony Corporation, Tokyo (JP)

(72) Inventors: Adam Li, Solana Beach, CA (US); Megan Farrell, San Diego, CA (US); Aixin Liu, San Diego, CA (US); Djung Nguyen, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/565,199

(22) Filed: Dec. 9, 2014

(65) Prior Publication Data

US 2015/0092110 A1      Apr. 2, 2015

Related U.S. Application Data

(63) Continuation of application No. 13/654,233, filed on Oct. 17, 2012, now Pat. No. 8,928,811.

(51) Int. Cl.
*H04N 5/58*       (2006.01)
*H04N 21/41*      (2011.01)
(Continued)

(52) U.S. Cl.
CPC ........... *H04N 21/4131* (2013.01); *H04N 5/147* (2013.01); *H04N 5/58* (2013.01);
(Continued)

(58) Field of Classification Search
CPC ............. H04N 5/58; H04N 5/57; H04N 9/73; H04N 9/3182; H04N 9/68; H04N 21/4382; H04N 21/2383; H04N 7/08; G09G 2360/144; G09G 2360/16; G09G 2320/0626; G09G 2320/0666; G09G 2320/0646; G09G 2320/0276; G09G 5/02; G09G 5/10; G09G 5/06; G09G 3/3648; G09G 3/3611; G09G 3/3406
USPC .......... 348/470, 602, 603, 658, 687; 345/204, 345/690, 589, 207, 102
IPC .............................. H04N 7/04, 5/57, 5/58, 9/73
See application file for complete search history.

(56) References Cited

U.S. PATENT DOCUMENTS 5,061,997 A * 10/1991 Rea et al. ...................... 348/143
6,140,987 A * 10/2000 Stein et al. ...................... 345/87
(Continued)

FOREIGN PATENT DOCUMENTS

WO      WO2012027643 A2 *  3/2012

OTHER PUBLICATIONS

Advisory Action from U.S. Appl. No. 13/654,279 mailed Nov. 20, 2014 (3 pgs.).
(Continued)

*Primary Examiner* — Sherrie Hsia
(74) *Attorney, Agent, or Firm* — Fitch, Even, Tabin & Flannery, LLP

(57) ABSTRACT

Methods and systems for producing ambient light effects based on video content are provided. A method of producing an ambient light effect includes providing a receiving device including a processor configured to parse incoming video content and receiving the video content including a plurality of scenes at the receiving device. The method further includes parsing the incoming video content and detecting at least one scene in the video content for association with at least one ambient light effect. The method also includes generating a command specifying at least one ambient light effect to be associated with at least one scene and sending the command from the receiving device to at least one lighting device in communication with the receiving device to generate at least one ambient light effect associated with at least one scene when the scene is displayed to a user.

20 Claims, 1 Drawing Sheet

(51) Int. Cl.
| | |
|---|---|
| *H04N 21/43* | (2011.01) |
| *H04N 21/81* | (2011.01) |
| *H04N 9/73* | (2006.01) |
| *H05B 37/02* | (2006.01) |
| *H04N 5/14* | (2006.01) |

(52) U.S. Cl.
CPC ............ *H04N 9/73* (2013.01); *H04N 21/43* (2013.01); *H04N 21/81* (2013.01); *H04N 21/816* (2013.01); *H05B 37/029* (2013.01); *H05B 37/0245* (2013.01)

(56) References Cited

U.S. PATENT DOCUMENTS

| | | | | |
|---|---|---|---|---|
| 6,577,080 | B2 * | 6/2003 | Lys et al. | 315/362 |
| 6,611,297 | B1 * | 8/2003 | Akashi et al. | 348/739 |
| 7,180,529 | B2 * | 2/2007 | Covannon et al. | 345/690 |
| 7,262,813 | B2 * | 8/2007 | Sato | 348/602 |
| 7,369,903 | B2 * | 5/2008 | Diederiks et al. | 700/28 |
| 7,616,262 | B2 * | 11/2009 | Eves et al. | 348/553 |
| 7,859,595 | B2 * | 12/2010 | Gutta et al. | 348/603 |
| 7,894,000 | B2 * | 2/2011 | Gutta et al. | 348/603 |
| 7,932,953 | B2 * | 4/2011 | Gutta et al. | 348/602 |
| 8,063,992 | B2 * | 11/2011 | Gutta et al. | 348/603 |
| 8,143,813 | B2 * | 3/2012 | Aarts | 315/307 |
| 8,576,340 | B1 * | 11/2013 | Li et al. | 348/602 |
| 2003/0057884 | A1 * | 3/2003 | Dowling et al. | 315/291 |
| 2005/0206788 | A1 * | 9/2005 | Eves et al. | 348/602 |
| 2006/0058925 | A1 * | 3/2006 | Diederiks et al. | 700/291 |
| 2006/0161270 | A1 * | 7/2006 | Luskin et al. | 700/22 |
| 2007/0055390 | A1 * | 3/2007 | Simon et al. | 700/19 |
| 2007/0091111 | A1 * | 4/2007 | Gutta | 345/591 |
| 2007/0157281 | A1 * | 7/2007 | Ellis et al. | 725/134 |
| 2007/0174773 | A1 * | 7/2007 | Abernethy et al. | 715/716 |
| 2007/0242162 | A1 * | 10/2007 | Gutta et al. | 348/645 |
| 2007/0288849 | A1 * | 12/2007 | Moorer et al. | 715/736 |
| 2007/0288975 | A1 * | 12/2007 | Cashman et al. | 725/110 |
| 2008/0129821 | A1 * | 6/2008 | Howarter et al. | 348/143 |
| 2008/0174254 | A1 * | 7/2008 | Abernethy et al. | 315/307 |
| 2009/0109340 | A1 * | 4/2009 | Iwanami et al. | 348/602 |
| 2009/0123086 | A1 * | 5/2009 | Iwanami et al. | 382/274 |
| 2009/0175536 | A1 * | 7/2009 | Gutta et al. | 382/166 |
| 2009/0212939 | A1 * | 8/2009 | Richmond | 340/539.11 |
| 2009/0219305 | A1 * | 9/2009 | Diederiks et al. | 345/690 |
| 2009/0249428 | A1 * | 10/2009 | White et al. | 725/133 |
| 2010/0005062 | A1 * | 1/2010 | Van Den Dungen | 707/3 |
| 2010/0052843 | A1 * | 3/2010 | Cannistraro | 340/3.32 |
| 2010/0071535 | A1 | 3/2010 | McKinney et al. | |
| 2010/0177247 | A1 * | 7/2010 | Sekulovski et al. | 348/602 |
| 2010/0213873 | A1 * | 8/2010 | Picard et al. | 315/297 |
| 2010/0231140 | A1 * | 9/2010 | Aarts | 315/307 |
| 2010/0238664 | A1 * | 9/2010 | Steenbergen | 362/276 |
| 2010/0244745 | A1 * | 9/2010 | Wendt | 315/312 |
| 2010/0262336 | A1 * | 10/2010 | Rivas et al. | 701/36 |
| 2010/0265414 | A1 * | 10/2010 | Nieuwlands | 348/739 |
| 2010/0289661 | A1 * | 11/2010 | Styers et al. | 340/686.1 |
| 2011/0075036 | A1 * | 3/2011 | Galeazzi et al. | 348/602 |
| 2011/0190911 | A1 * | 8/2011 | Iwanami et al. | 700/90 |
| 2011/0245941 | A1 * | 10/2011 | De Waele et al. | 700/90 |
| 2012/0013257 | A1 * | 1/2012 | Sibert | 315/152 |
| 2012/0068832 | A1 * | 3/2012 | Feldstein et al. | 340/12.5 |

OTHER PUBLICATIONS

Advisory Action from U.S. Appl. No. 13/654,190 mailed Oct. 15, 2014 (3 pgs.).
Final office action from U.S. Appl. No. 13/654,190 mailed Jul. 17, 2014 (29 pgs.).
Final office action from U.S. Appl. No. 13/654,279 mailed Sep. 23, 2014 (27 pgs.).
Non-final office action from U.S. Appl. No. 14/156,344 mailed Mar. 11, 2014 (15 pgs.).
Non-Final Office Action from U.S. Appl. No. 13/654,190 mailed Jan. 22, 2014 (11 pgs.).
Non-Final Office Action from U.S. Appl. No. 13/654,190 mailed Jul. 17, 2013 (10 pgs.).
Non-Final Office Action from U.S. Appl. No. 13/654,233 mailed Jul. 16, 2014 (14 pgs.).
Non-final Office Action from U.S. Appl. No. 13/654,279 mailed May 7, 2014 (20 pgs.).
Non-Final Office Action from U.S. Appl. No. 13/654,255 mailed Jun. 19, 2013 (17 pgs.).
Notice of Allowance from U.S. Appl. No. 13/654,213 mailed Jun. 18, 2013 (11 pgs.).
Notice of Allowance from U.S. Appl. No. 13/654,213 mailed Sep. 3, 2013 (7 pgs.).
Notice of Allowance from U.S. Appl. No. 13/654,233 mailed Sep. 24, 2014 (7 pgs.).
Notice of Allowance from U.S. Appl. No. 13/654,255 mailed Jul. 22, 2014 (11 pgs.).
Notice of Allowance from U.S. Appl. No. 13/654,255 mailed Mar. 27, 2014 (12 pgs.).
Notice of Allowance from U.S. Appl. No. 13/654,255 mailed Nov. 20, 2013 (14 pgs.).
Notice of Allowance from U.S. Appl. No. 13/654,255 mailed Oct. 27, 2014 (11 pgs.).
Notice of Allowance from U.S. Appl. No. 14/156,344 mailed Jun. 4, 2014 (13 pgs.).
Notice of Allowance from U.S. Appl. No. 14/156,344 mailed Oct. 27, 2014 (11 pgs.).
Examiner's Answer from U.S. Appl. No. 13/654,190 mailed May 5, 2015 (23 pgs.).
Non-final office action from U.S. Appl. No. 13/654,272 mailed Mar. 18, 2015 (39 pgs.).
Non-Final office action from U.S. Appl. No. 13/654,279 mailed Mar. 9, 2015 (23 pgs.).

* cited by examiner

METHODS AND SYSTEMS FOR GENERATING AMBIENT LIGHT EFFECTS BASED ON VIDEO CONTENT

FIELD

This invention relates to ambient light effects, and more specifically, to ambient light effects generated based on video content.

BACKGROUND

Television programs, movies, and video games most commonly provide visual stimulation from a television screen display and audio stimulation from the speakers connected to the television. There are some known systems that attempt to enhance a viewer's/user's experience by providing a more interactive/responsive environment. For example, some video gaming systems cause lighting devices such as lamps to generate an ambient light effect ("ALE") during game play.

To provide an enjoyable interactive experience, the lighting devices need to generate the ambient light effects at appropriate times when the associated scene is displayed to a user. In addition, the lighting devices need to generate a variety of ambient light effects to appropriately match a variety of scenes and action sequences in a movie or a video game. Thus, an ambient light effect-capable system needs to be able to identify one or more scenes during the display of which an ambient light effect is to be generated.

One such system focuses on detecting and analyzing various parameters of the video file or video game application and generating ambient light effects based on the detected parameters. One problem with such an approach is that many video files and video games include various access restrictions imposed by the content providers, and such restrictions may make it difficult or impossible to analyze the parameters of a video file and/or video game.

Some existing systems include lighting devices that produce only various intensities and flickering of white colored light. A disadvantage of such systems is that while the television programs, movies, and video games typically include a wide variety of scenes, events, and action sequences, the known ambient light systems are limited to generating a single light color which may appear too repetitive to users and cause the users to lose interest in such ambient light effects. Accordingly, what is needed is a way of producing ambient light effects in association with one or more portions of a video file that overcomes the aforementioned shortcomings.

SUMMARY

The present invention satisfies this need. In one embodiment, a method of producing an ambient light effect is provided. The method comprises: providing a receiving device including a processor configured to parse incoming video content; receiving the video content at the receiving device, the video content including a plurality of scenes; parsing the incoming video content and detecting at least one scene in the video content for association with at least one ambient light effect; generating a command specifying the at least one ambient light effect to be associated with the at least one scene; and sending the command from the receiving device to the at least one lighting device in communication with the receiving device to generate the at least one ambient light effect associated with the at least one scene when the at least one scene is displayed to a user.

In one approach, the receiving device is selected from one of a television, set-top box, disc player, personal computer, laptop, tablet computer, and mobile phone.

In an approach, the method includes detecting at least one scene having a brightness level exceeding a predetermined threshold. In another approach, the method includes detecting at least one scene having a brightness level below a predetermined threshold. In yet another approach, the method further includes detecting at least one scene having a sound level exceeding a predetermined threshold. In still another approach, the method further includes detecting at least one scene having a sound level below a predetermined threshold. In yet another approach, the method further includes detecting an action in the at least one scene predetermined to be associated with the at least one ambient light effect.

In an approach, the method comprises including in the command chrominance control data specifying at least one color selected from red, green, blue, or combinations thereof to be generated by the at least one lighting device. In another approach, the method further comprises specifying in the command a color intensity of the at least one light color specified by the chrominance control data. In yet another approach, the method further includes specifying a predetermined time when the at least one ambient light effect is to be generated by the at least one lighting device. In still another approach, the method further comprises specifying the at least one lighting device for generating the at least one ambient light effect specified in the command. In yet another approach, the method further comprises specifying a location of the at least one lighting device relative to the receiving device.

In one approach, the method further includes sending the command from the receiving device to the at least one lighting device via one of a wired connection and a wireless connection. In another approach, the method further includes sending the command from the receiving device to the at least one lighting device via an intermediate receiver. In yet another approach, the method further includes sending the command from the receiving device to the at least one lighting device via a home automation system.

The systems and methods described herein provide an engaging experience to a user when watching television programming, movies, or playing video games. One advantage of the systems and methods described therein is that television programming, movies, and video games can be made more interactive for a user by including ambient light effects can be generated by one or more lighting devices. Another advantage is that the ambient light effects are generated based on information detected from the video file representing the television program, movie, or video game and obviates a necessity of manually associating scenes with ambient light effects and writing the ambient light effects into the video files. Yet another advantage of the systems and methods described herein is that unlike prior systems producing ambient light effects in various shades of white, the ambient light effects described herein can include a large variety of colors. These and other advantages will be apparent upon consideration of the present specification.

DETAILED DESCRIPTION

Reference will now be made in detail to the present preferred embodiments of the invention, examples of which are illustrated in the accompanying drawings.

Generally, systems and methods are described herein for providing ambient light effects for a user when watching television programming, movies, or playing video games. The ambient light effects can be generated by one or more lighting devices based on information contained in the video file representing the television program, movie, or video game. The ambient light effects so generated can include chrominance control data that can result in the ambient light effects to be presented to users in a variety of colors. As such, a dynamic and more interactive experience is provided for a user.

Figure 1:
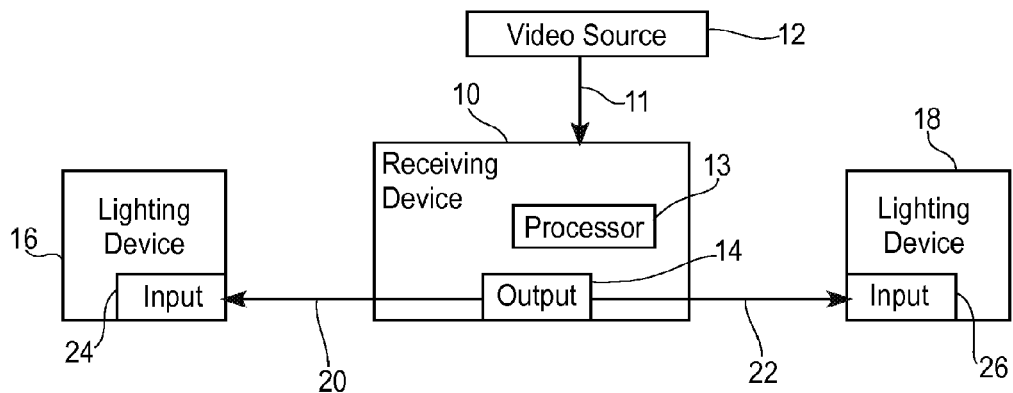
FIG. 1 is a schematic view of an exemplary system for performing a method according to one embodiment.

With specific reference to FIG. 1, in one embodiment of a method of controlling ambient light effects, a receiving device 10 receives video files from a video source 12 via a connection 11. The receiving device 10 can be any one of a television, set-top box, optical disc player such as a DVD-player or Blu-Ray player, portable media player, personal computer, laptop, tablet computer, gaming console, mobile phone, and the like.

The video source 12 can be any source capable of providing digital video files via a connection 11 to the receiving device 10. The video source 12 can be a cable head-end, a DVD or Blu-Ray disc, a video game disc, hard drive, or a digital media server capable of streaming to the receiving device 10. Although the receiving device 10 preferably receives the video files from the video source 12 via a wired connection 11, the connection 11 between the receiving device 10 and the video source 12 can also be wireless.

In one approach shown in FIG. 1, the receiving device 10 is directly connected to two lighting devices 16 and 18 via connections 20 and 22, respectively. The receiving device 10 has an output 14 and the lighting devices 16 and 18 each have an input 24 and 26, respectively, which can be interconnected via the respective connections 20 and 22. It is to be appreciated that the connections 20 and 22 can be either wired or wireless connections, and the receiving device 10 and the lighting devices 16 and 18 can be connected as described in more detail in co-pending application entitled "VIDEO FILES INCLUDING AMBIENT LIGHT EFFECTS," filed on Oct. 11, 2012, the entire disclosure of which is incorporated by reference herein.

The lighting devices 16 and 18 can be any type of household or commercial device capable of producing visible light. For example only, the lighting devices 16 and 18 may be stand-alone lamps, track lights, recessed lights, wall-mounted lights or the like. In one approach, the lighting devices 16 and 18 are capable of generating light having color based on the RGB model or any other visible colored light in addition to white light. In another approach, the lighting devices 16 and 18 are also adapted to be dimmed.

The receiving device 10 has been shown in FIG. 1 as being connected to two lighting devices 16 and 18 by way of example only, and it will be appreciated that that the receiving device 10 can be connected to any number of lighting devices 16 and 18 suitable for a given room where the receiving device 10 is located. In one exemplary approach, the receiving device 10 may be connected to only one lighting device 16. In another approach, the receiving device 10 may be connected to four lighting devices each located in a corner of a room, in another approach, the receiving device 10 may be connected to at least two lighting devices located in front of a user, at least two lighting devices located on right and left sides of the user, and at least two lighting devices located behind the user so as to create a surround ambient light effect for the user. It is to be appreciated that the lighting devices 16 and 18 can be identical to each other, or can be different such that the receiving device 10 can be simultaneously connected to two, three, four, or more types of different lighting devices.

Figure 2:
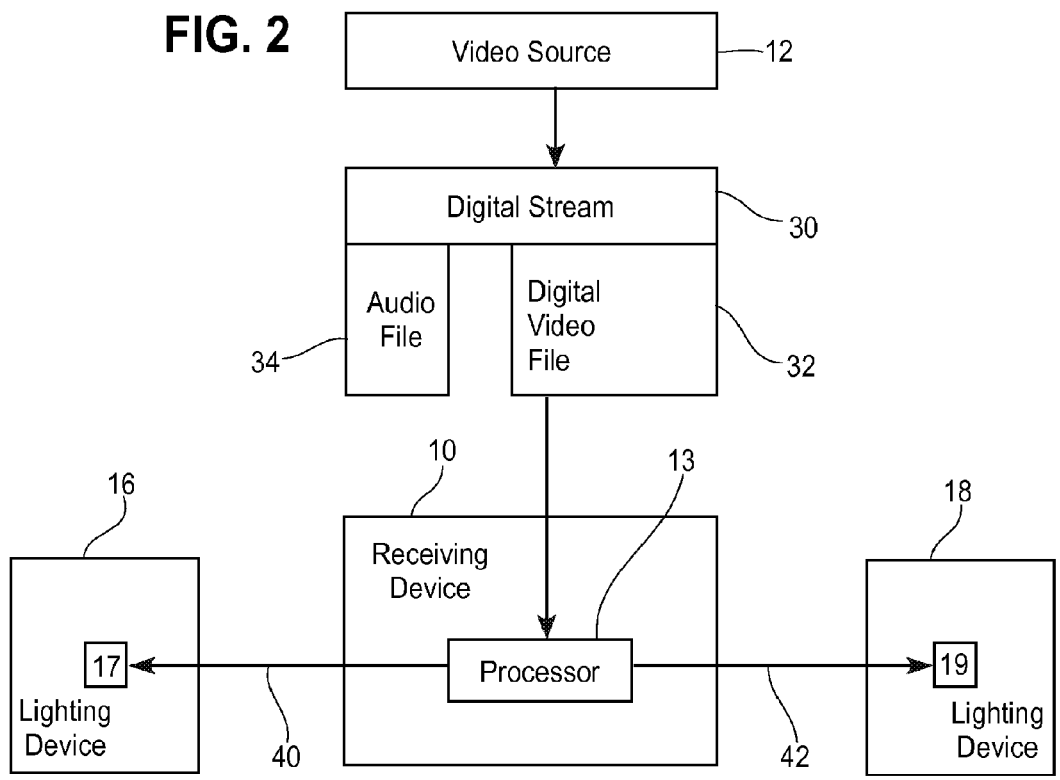
FIG. 2 is a schematic diagram of an exemplary video stream and an exemplary system for performing a method according to an embodiment.

With reference to FIG. 2, the receiving device 10 is adapted for parsing an incoming digital video signal or a digital video file coming from a video source 12. In an embodiment, the receiving device 10 includes a processor 13 programmed to parse an incoming digital video signal or digital video file. For purposes of this application, the term "processor" will be understood to mean any hardware and/or software component programmable to parse the incoming digital video signal or digital video file. For example, the processor 13 may be a decoder or part of a graphics card.

FIG. 2 shows an exemplary digital video stream 30 incoming from the video source 12 and being received by the receiving device 10. The digital video stream 30 includes a digital video file 32 and a digital audio file 34. When the digital video stream 30 is received by the receiving device 10 from the video source 12, the processor 13 performs the parsing of the digital video file 32 to detect one or more portions of the video file 32 to be associated with one or more ambient light effects.

In one approach, the processor 13 is programmed to include an algorithm adapted to determine which one or more portions of the video file 32 are to be associated with at least one ambient light effect. In another approach, the processor 13 is also programmed to include an algorithm adapted to determine what ambient light effect to associate with the portion of the video file 32 identified by the processor 13 for association with the ambient light effect. In yet another approach, the processor 13 includes an algorithm adapted to identify certain scenes, action sequences, and events of the program, movie, or game contained in the digital video file 32.

The ambient light effects can be associated by the processor 13 with any portion of the video file 32. For example, portions of the video file 32 with which an ambient light effect can be associated by the processor 13 include, but are not limited to, background settings (day, night, outdoor, indoor, etc.), action sequences (e.g., car chases, explosions, fights, etc.), specific events (e.g., a character is born, a character goes to sleep or wakes up, a character dies, etc.). By way of example only, the lighting devices can generate green light effect for an action sequence showing plants blooming in the Spring and a yellow light effect for an action sequence showing leaves falling in the Fall.

In one approach, the processor 13 is programmed to include an algorithm to generate chrominance control data for inclusion into the ambient light effect such that the ambient light effect can be composed of colors including, but not limited to, red, green, blue, and combinations thereof. The generation of ambient light effects based on chrominance control data is described in more detail in co-pending application entitled "AMBIENT LIGHT EFFECTS AND CHROMINANCE CONTROL IN VIDEO FILES," Filed on Oct. 11, 2012, the entire disclosure of which is incorporated by reference herein. In another approach, the processor 13 is programmed to include an algorithm adapted to determine a color intensity of the at least one light color specified by the chrominance control data.

In one approach, the processor 13 is programmed to include an algorithm for detecting at least one scene having a brightness level exceeding a predetermined threshold. In another approach, the method includes detecting at least one scene having a brightness level below a predetermined threshold. For example, the processor 13 can be programmed to assign one type of ambient light effect to a scene taking place at night and a different type of ambient light effect to a scene taking place during the day.

In yet another approach, the processor 13 is programmed to include an algorithm for detecting at least one scene having a sound level exceeding a predetermined threshold. In still another approach, the processor 13 is programmed to include an algorithm for detecting at least one scene having a sound level below a predetermined threshold. For example, the processor 13 can be programmed with an algorithm to assign one type of ambient light effect to a scene taking place in a bar or on a battlefield and another type of ambient light effect to a scene taking place in a library.

In still another approach, the processor 13 is programmed to include an algorithm for detecting an action or event in the at least one scene predetermined to be associated with the at least one ambient light effect. For example, the processor 13 can be programmed with an algorithm to assign one type of ambient light effect to a touchdown scored in a football game and a different type of ambient light effect to an turnover committed by the same team.

In yet another approach, the processor 13 is programmed to include an algorithm for specifying one or more of the lighting devices 16 and 18 for generating the at least one ambient light effect associated with at least one scene in the video file 32. In still another approach, the processor 13 is also programmed to specify a location of the specified lighting device (e.g., lighting device 16 or lighting device 18, or both) relative to the receiving device 10.

The lighting devices 16 and 18 can include hardware components 17 and 19, respectively. For example only, the hardware components 17 and 19 can be decoders programmed to interpret the ambient light effect information received from the receiving device 10 in the commands 40 and 42, respectively. In an approach, the hardware components 17 and 19 can be configured to cause the lighting devices 16 and 18, respectively, to generate one or more of the ambient light effect based on the data received in the commands 40 and 42.

In an approach, the lighting devices 16 and 18 may include at least one software component adapted for interpreting the ambient light effect data received from the receiving device in the commands 40 and 42. In one approach, the software component can be adapted to cause the lighting devices 16 and 18 to generate one or more of the ambient light effects specified in the commands 40 and 42, respectively.

When the commands 40 and 42 from the receiving device 10 are received by the lighting devices 16 and 18, the lighting devices 16 and 18 generate the ambient light effects specified in the commands 40 and 42. As such, the ambient light effects specified in the commands 40 and 42 are generated by the lighting devices 16 and 18, respectively, preferably, when the one or more portions of the digital video file 32 associated with the one or more ambient light effects specified in the commands 40 and 42 are displayed to the user.

The generation of ambient light effects including one or more different colors by the lighting devices 16 and 18 in association with scenes, action sequences, and events specified in the commands 40 and 42 generated by the processor 13 provides an enhanced and visually pleasing and interactive experience for a user watching a television program or a movie, or playing a video game.

In one approach, a graphical user interface can provided to a user to permit the user to configure one or more options for controlling the generation of the ambient light effects by the lighting devices 16 and 18 based on ambient light effects specified by the processor 13 in the commands 40 and 42. This provides a personally tailored experience for each specific user.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

What is claimed is:

1. A receiving device for producing an ambient light effect, the receiving device comprising:
a processor configured to parse an incoming digital video file including a plurality of scenes, the processor programmed to:
parse the incoming digital video file and detect, based on information contained in the digital video file, at least one scene in the digital video file for association with at least one ambient light effect;
generate a command specifying the at least one ambient light effect to be associated with the at least one scene; and
send the command from the receiving device to at least one lighting device in communication with the receiving device to generate the at least one ambient light effect associated with the at least one scene when the at least one scene is displayed to a user.

2. The receiving device of claim 1, wherein the receiving device is at least one of a television, set-top box, disc player, personal computer, laptop, tablet computer, and mobile phone.

3. The receiving device of claim 1, wherein the processor is one of a stand-alone decoder and a decoder incorporated into a graphics card integrated into the receiving device.

4. The receiving device of claim 1, wherein the processor is programmed to detect at least one scene in the digital video file predetermined to be associated with the at least one ambient light effect.

5. The receiving device of claim 1, wherein the processor is programmed to specify in the command chrominance control data specifying at least one color selected from red, green, blue, or combinations thereof to be generated by the at least one lighting device.

6. The receiving device of claim 5, wherein the processor is programmed to specify in the command a color intensity of the at least one light color specified by the chrominance control data.

7. The receiving device of claim 1, wherein the processor is programmed to specify in the command a predetermined time when the at least one ambient light effect is to be generated by the at least one lighting device.

8. The receiving device of claim 1, wherein the processor is programmed to specify in the command at least one lighting device for generating the at least one ambient light effect specified in the command.

9. The receiving device of claim 1, wherein the processor is programmed to send the command from the receiving device to the at least one lighting device via an intermediate receiver.

10. The receiving device of claim 1, wherein the processor is programmed to send the command from the receiving device to the at least one lighting device via a home automation system.

11. A method of producing an ambient light effect, the method comprising:

sending a digital video stream including an audio file and a video file with a plurality of scenes from a video source to a receiving device including a processor configured to:

parse the digital video file and detect, based on information contained in the digital video file, at least one scene in the digital video file for association with at least one ambient light effect;

generate a command specifying the at least one ambient light effect to be associated with the at least one scene; and send the command from the receiving device to at least one lighting device in communication with the receiving device to generate the at least one ambient light effect associated with the at least one scene when the at least one scene is displayed to a user.

12. The method of claim 11, wherein the receiving device is one of a television, set-top box, decoder, graphics card, media player, disc player, personal computer, laptop, tablet computer, and mobile phone.

13. The method of claim 11, wherein the video source is one of a cable head-end, a digital video disc, a video game disc, a hard drive, and a digital media server configured to send the digital video stream to the receiving device.

14. The method of claim 11, wherein the processor is programmed to detect at least one scene in the digital video file predetermined to be associated with the at least one ambient light effect.

15. The method of claim 11, wherein the processor is programmed to specify in the command chrominance control data specifying at least one color selected from red, green, blue, or combinations thereof to be generated by the at least one lighting device.

16. The method of claim 15, wherein the processor is programmed to specify in the command a color intensity of the at least one light color specified by the chrominance control data.

17. The method of claim 11, wherein the processor is programmed to specify in the command a predetermined time when the at least one ambient light effect is to be generated by the at least one lighting device.

18. The method of claim 11, wherein the processor is programmed to specify in the command at least one lighting device for generating the at least one ambient light effect specified in the command.

19. The method of claim 11, wherein the processor is programmed to send the command from the receiving device to the at least one lighting device via an intermediate receiver.

20. The method of claim 11, wherein the processor is programmed to send the command from the receiving device to the at least one lighting device via a home automation system.

* * * * *